Jan. 18, 1938. C. J. HOLLAND 2,105,651
VEHICLE SPRING
Filed Oct. 24, 1934
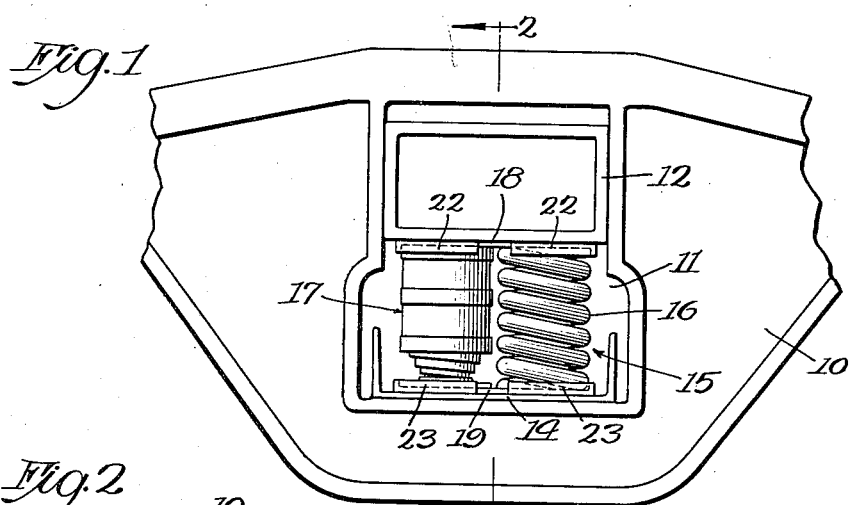
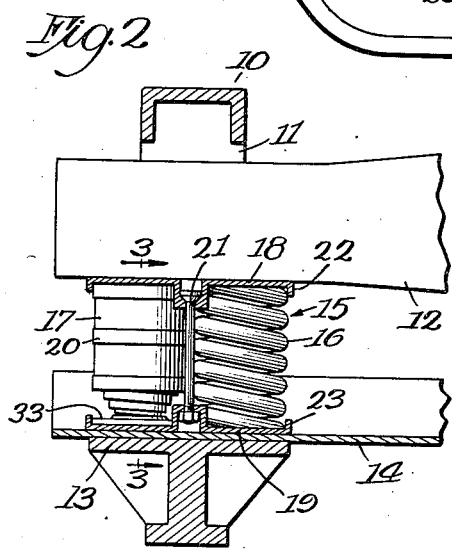
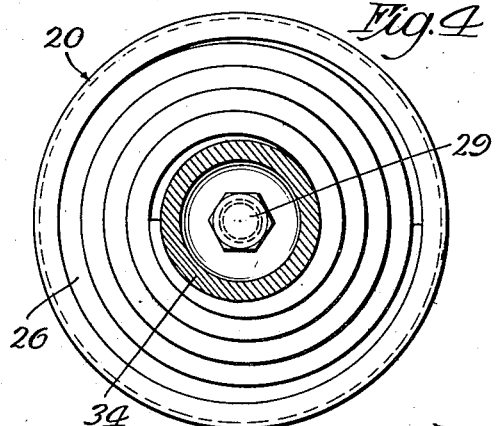
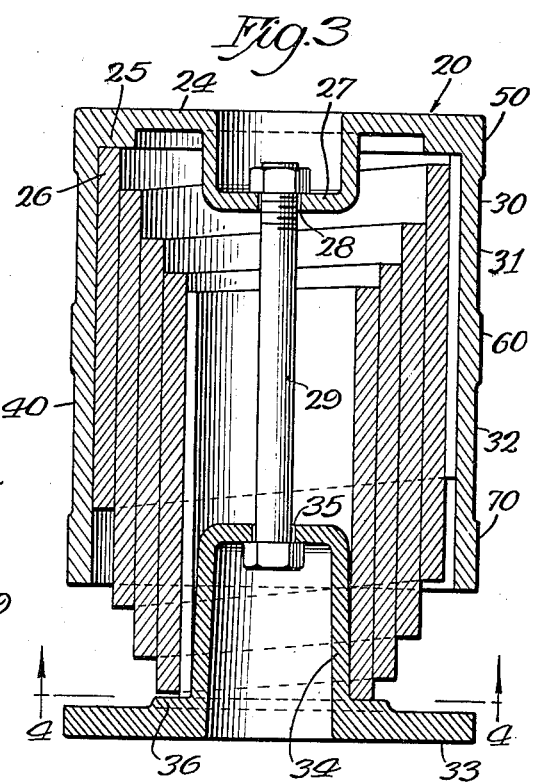
Inventor:
Cyrus J. Holland
By Gilson, Mann & Co.
Attys.

Patented Jan. 18, 1938

2,105,651

UNITED STATES PATENT OFFICE 2,105,651

VEHICLE SPRING

Cyrus J. Holland, Chicago, Ill., assignor to Holland Company, a corporation of Illinois Application October 24, 1934, Serial No. 749,801

6 Claims. (Cl. 267—4)

This invention relates to vehicle springs and, more particularly, to springs normally having engaging friction surfaces adapted to frictionally resist compression of the spring or of the assembly in which the spring is employed and especially adapted for supporting vehicle bodies.

The principal object of the invention is the provision of a new and improved spring normally having internal friction and adapted to be used alone or in an assembly and having novel means for causing an increase in the internal friction of the spring during its operation.

Another object of the invention is the provision of new and improved means for increasing the internal friction of springs of the volute type.

A further object of the invention is the provision of new and improved means for limiting radial expansion of springs of the volute type during compression whereby greater internal friction among the turns is developed.

A still further object of the invention is the provision of a new and improved friction spring that is simple in construction, inexpensive to manufacture, easily assembled and one in which the internal frictional resistance of the individual spring may be materially increased.

Other and further objects and advantages of the invention will appear from the following description, taken in connection with the accompanying drawing, in which:—

Fig. 1 is a side elevation of a portion of a railway truck showing the invention in position therein, with parts broken away;

Fig. 2 is a section on the line 2—2 of Fig. 1;

Fig. 3 is a vertical section of the volute spring on the line 3—3 of Fig. 2; and Fig. 4 is a section on the line 4—4 of Fig. 3.

In my application Serial No. 492,047 is disclosed the combination of helical and volute springs for supporting the bolster of a railway truck. It is well-known that where each end of the bolster is supported entirely by an assembly of helical springs that unless means are provided for dampening the harmonic vibration of the springs that under certain conditions the harmonic vibration of the assembly will build up to such an extent as to cause the springs to go solid with the result that not infrequently damage is done to the springs or to the side frame of the truck.

In my copending application referred to above is disclosed the use of a volute in a spring assembly including helical springs which function to assist in resiliently supporting the bolster, and at the same time the internal friction of the turns will function to dampen the harmonic action of the spring assembly.

The present invention is an improvement on the assembly therein disclosed. In the present invention, suitable means are provided for increasing the internal friction of the volute spring by providing suitable means for limiting the radial distortion of the spring.

Referring now to the drawing, the reference character 10 designates a side frame of a railway truck having a bolster opening 11 therein, in which is mounted the bolster 12, as is usual in such constructions. The side frame is provided with laterally extending supports 13 (see Fig. 2) on which a spring plank 14 is supported. Interposed between the spring plank 14 and the bolster 12 is a spring assembly 15 comprising a plurality of helical springs 16 and one or more volute springs 17. The assembly is provided with the upper spring plate or cap 18 and the lower spring plate or cap 19 which are adapted to be connected together by a bolt 21, as is usual in such constructions. The spring caps or plates 18 and 19 are provided with spring retaining flanges or lips 22 and 23, respectively, for retaining the springs in assembled relation.

The volute spring 17 is provided with means for limiting radial distortion. Any suitable means may be employed for this purpose. In the form of construction shown, which is by way of example only, an endless band is positioned over the outer turn to limit radial expansion thereof during compression. This band may be, and preferably is, in the form of a casing 20. This casing is preferably, though not necessarily, an inverted cup-shaped member 30 having a side wall 40 and an end wall 24. The cup is adapted to be positioned over the larger end of the volute when the unit is assembled. The end 24 has an annular thickened portion 25 which is adapted to take the thrust of the outer turn 26 of the volute. The central portion of the end 24 is depressed, as at 27, and is provided with an axial opening 28 through which the retaining bolt 29 extends. If desired, the side wall 40 of the casing may be reduced, as at 31 and 32, for reducing its weight or the casing may be regarded as being increased in thickness at its ends and intermediate portion to form reinforcing bands, 50, 60 and 70 (see Fig. 3).

Where a cap or casing is employed for limiting the radial expansion of a volute during compression, the inner or smaller turns of the volute tend to contract. By limiting this contraction, two advantages may be obtained—first, the friction between the turns is increased, and, second, limiting the inward contraction or distortion of the spring will necessarily increase the capacity of the spring.

Any suitable means may be employed for limiting the inward radial contraction of the small end of the volute. In the form of the construction shown, a base member 33 is provided which has an axial inward projection which, for convenience of description, will be termed a depression 34 that is hollow and is provided with an axial opening 35 for receiving the bolt 29. The external circumference of the depression 34 is slightly greater than the internal diameter of the inner turn of the volute so that when the same is inserted in the volute, the inner turn is slightly expanded. Preferably, though not necessarily, the depression 34 is tapered slightly toward its inner end so that the outer edges only of the inner turn of the volute engage the projection, as clearly shown in Fig. 3 of the drawing. By tapering the depression, clearance is provided for permitting more or less lateral movement or weaving of the spring which occurs during the operation of the car in which the springs are used.

The base 33 is thickened as at 36 about the depression 34 for receiving the thrust of the inner turn of the volute during compression of the spring. The depressions 27 and 34 in the casing and the base respectively are of such dimensions as to afford sufficient clearance for the bolt 29. In assembling the device, the spring is preferably placed under more or less tension and is held in that position by the said bolt. The casing 31 is preferably, though not necessarily, slightly deeper than the width of the turns of the volute so that said casing will engage the vase for limiting the compression of the spring without the spring going solid. This is an important feature of the invention because the casing will thereby prevent injury to the spring as otherwise the spring, in going solid, might become permanently distorted—that is, become "set".

In compressing volute springs, the turns expand radially and frictionally engage each other. By providing the casing 20, the radial expansion of the spring is limited, thereby materially increasing the friction between the turns of the spring. The increase in the friction, due to the use of the casing, may, therefore, be varied within certain limits by employing casings of different internal diameters. If the casing fits too tightly, however, the friction will be so great that the spring will be prevented from returning to its normal expanded position. The casing 20 and the base 33 may be of any suitable form in cross section, depending upon the structure or combination in which the spring is to be used.

If, for instance, the springs are to be employed in a spring assembly for supporting a railway bolster, these members are preferably circular in cross section and of substantially the same diameter as that of the conventional helical springs, whereby they may be substituted for one or more of those springs in the assembly.

In railway car suspension, it is desirable that the spring assemblies be so constructed that harmonic action of the springs be prevented and that light, as well as heavy loads, have the desired resiliency. In the use of helical springs alone for supporting the car body, if the springs have sufficient capacity for full load, they are too stiff for light loads, and if they be so constructed that they have the desired resiliency for light loads, they are likely to go solid with heavy loads and injure the springs or the truck. In either case, under certain conditions, periodic vibration or harmonic action of the spring assembly may occur, due to flat wheels or low places in the track at regular intervals, and the like.

With the use of volutes, this difficulty may be largely eliminated due to the friction between the turns of the volute.

The first portion of the load deflection line of a volute is straight and the remainder curved, hence, with the use of this type of spring in combination with helicals, the desired characteristics for the entire spring assembly may be approximated. And since the load deflection curve of volutes may be varied by preventing the expansion of the turns, it follows that by employing one or more modified volutes in the helical spring assembly, the desired deflection curve for any set of particular load requirements may be obtained or at least approximated.

While the volute is shown as having its larger end turned up, it is understood that the spring may be reversed in use, if desired.

It is thought from the foregoing taken in connection with the accompanying drawing that the construction and operation of my device will be apparent to those skilled in the art and that changes in size, shape, proportion and details of construction may be made without departing from the spirit and scope of the appended claims.

I claim as my invention:—

1. A cap for a volute spring comprising a cylindrical cup-shaped metallic member having thickened bands extending about the wall thereof and having a thickened annular portion on the bottom wall of said member for engaging the outer turn of a volute spring, said bottom wall being provided with a depressed portion having an axial opening therethrough.

2. A spring unit for use in a railway car comprising a single volute spring, a cup-shaped metallic member positioned over and enclosing the larger end of said volute spring for limiting the radial expansion of said spring upon the compression thereof, said member engaging the outer turn of said volute spring and having a bottom wall provided with a depression, a base member having a hollow depression engaging in the smaller end of said volute spring, said depression tapering inwardly, said base member having a thickened annular portion extending about said last-named depression and engaging the end of the innermost turn of said volute spring, and means for limiting the separation of said base member and cup-shaped member.

3. A resilient unit comprising a closely wound volute spring having its turns in frictional engagement, a continuous band member extending about the periphery of the larger end of the volute and engaging the outer turn of said spring and holding the same under initial compression for limiting radial expansion during compression of said spring, and means engaging the interior of the innermost turn of said spring for preventing radial contraction of said turn, said turn being normally in clamping engagement with said means.

4. In a railway car, a truck having a side frame, a bolster, a spring assembly for supporting one end of said bolster from said frame, said assembly comprising helical springs and at least one volute spring, said volute having its turns in frictional engagement, a base having a radially extending flange and an upwardly extending hollow projection, a cap extending about said volute and engaging the outer turn thereof for limiting radial outward distortion of said spring during compression thereof, said base having an axial depression, said spring clampingly engaging said projection during compression, and a bolt extending through said depression and projection for limiting the expansion of said spring.

5. A spring unit for use on a railway truck comprising a base member having a radial flange and an upward extension, a single volute spring having its layers in frictional contact and in engagement with said radial flange and in clamping engagement with said extension during compression, and a cylindrical casing enclosing the outer turns of the spring and normally engaging the same, the length of said casing being but slightly greater than the width of the outer turn of said spring for engaging said base member for limiting the compression of said spring.

6. In a spring unit for use on a railway car comprising a volute spring having overlapping layers in frictional contact, a cup-shaped cap member positioned over the end of the spring having the larger diameter and normally engaging the outer turn of said volute, said cap member having an axial depression, a base member having an axial depression positioned in the end of said spring having the smaller diameter for limiting radial contraction of said spring, and a bolt engaging said depressions for limiting the separation of said base and member.

CYRUS J. HOLLAND.